US010865687B2

(12) United States Patent
Sasaki et al.

(10) Patent No.: US 10,865,687 B2
(45) Date of Patent: Dec. 15, 2020

(54) EXHAUST GAS ENERGY RECOVERY DEVICE

(71) Applicant: IHI Corporation, Koto-ku (JP)

(72) Inventors: Yuji Sasaki, Koto-ku (JP); Takashi Yoshida, Koto-ku (JP); Tatsumi Inomata, Koto-ku (JP); Kuniaki Iizuka, Koto-ku (JP); Takuya Ozasa, Koto-ku (JP); Ryosuke Yumoto, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/344,238

(22) PCT Filed: Nov. 7, 2017

(86) PCT No.: PCT/JP2017/040100
§ 371 (c)(1),
(2) Date: Apr. 23, 2019

(87) PCT Pub. No.: WO2018/084309
PCT Pub. Date: May 11, 2018

(65) Prior Publication Data
US 2019/0257234 A1 Aug. 22, 2019

(30) Foreign Application Priority Data

Nov. 7, 2016 (JP) ................................ 2016-217186

(51) Int. Cl.
*F01N 5/04* (2006.01)
*B60W 10/16* (2012.01)
(Continued)

(52) U.S. Cl.
CPC ............... *F01N 5/04* (2013.01); *B60W 10/26* (2013.01); *B60W 20/00* (2013.01); *H02J 7/00* (2013.01);
(Continued)

(58) Field of Classification Search
CPC ......... F01N 5/04; B60W 10/26; B60W 20/00; H02J 7/00; H02J 7/02; H02J 7/1423;
(Continued)

(56) References Cited

U.S. PATENT DOCUMENTS 4,328,427 A * 5/1982 Bond ..................... B60L 50/12
290/3
4,756,377 A * 7/1988 Kawamura ............. F02B 39/10
60/608
(Continued)

FOREIGN PATENT DOCUMENTS

CN 201679543 U 12/2010
CN 104389664 A 3/2015
(Continued)

OTHER PUBLICATIONS

International Search Report dated Jan. 9, 2018, in PCT/JP2017/040100 filed on Nov. 7, 2017.

*Primary Examiner* — Thai Ba Trieu
(74) *Attorney, Agent, or Firm* — Oblon, McClelland, Maier & Neustadt, L.L.P.

(57) ABSTRACT

An exhaust gas energy recovery device includes a power generation device driven by a turbine configured to rotate by an exhaust gas, a switching element connected to the power generation device, a first terminal connected to the power generation device via the switching element and for being connected to a first power storage device, and a second terminal connected to the power generation device and for being connected to a second power storage device, in which a terminal voltage of the first power storage device is lower than a terminal voltage of the second power storage device, and the switching element switches a destination to be charged by the power generation device to either the first power storage device or the second power storage device on
(Continued)

the basis of magnitude of a direct current voltage output from the power generation device.

4 Claims, 4 Drawing Sheets

(51) Int. Cl.
| | |
|---|---|
| *B60W 20/00* | (2016.01) |
| *H02J 7/14* | (2006.01) |
| *H02J 7/00* | (2006.01) |
| *H02J 7/02* | (2016.01) |
| *H02J 15/00* | (2006.01) |
| *H02M 3/155* | (2006.01) |
| *H02M 3/156* | (2006.01) |
| *H02M 7/06* | (2006.01) |
| *H02M 1/00* | (2006.01) |
| *B60W 10/26* | (2006.01) |
| *H02P 9/04* | (2006.01) |

(52) U.S. Cl.
CPC .............. *H02J 7/02* (2013.01); *H02J 7/1423* (2013.01); *H02J 15/00* (2013.01); *H02M 3/155* (2013.01); *H02P 9/04* (2013.01); *H02M 3/156* (2013.01); *H02M 7/06* (2013.01); *H02M 2001/007* (2013.01); *Y02T 10/12* (2013.01)

(58) Field of Classification Search
CPC ........ H02J 15/00; H02M 3/155; H02M 3/156; H02M 7/06; H02M 2001/007; F02P 9/04; Y02T 10/16; F02B 39/04; F02B 49/10
USPC .......................................... 60/608, 598, 623
See application file for complete search history.

(56) References Cited

U.S. PATENT DOCUMENTS

| | | | | |
|---|---|---|---|---|
| 4,805,409 A | * | 2/1989 | Kobayashi | F02B 41/10 60/597 |
| 4,878,347 A | * | 11/1989 | Kawamura | F02B 39/10 60/608 |
| 4,882,905 A | * | 11/1989 | Kawamura | F02B 39/10 60/608 |
| 4,886,978 A | * | 12/1989 | Kawamura | F02B 41/10 60/597 |
| 4,901,530 A | * | 2/1990 | Kawamura | F02B 39/10 60/608 |
| 5,719,486 A | | 2/1998 | Taniguchi et al. | |
| 6,570,265 B1 | | 5/2003 | Shiraishi et al. | |
| 7,541,687 B2 | * | 6/2009 | Stahlhut | B60W 10/26 290/52 |
| 7,781,904 B2 | * | 8/2010 | Stahlhut | B60W 10/26 290/52 |
| 8,555,639 B2 | * | 10/2013 | Watanabe | B60W 10/26 60/608 |
| 9,109,503 B2 | * | 8/2015 | Niizuma | F01N 5/04 |
| 9,975,449 B2 | * | 5/2018 | Takeshima | H02J 7/14 |
| 10,598,085 B2 | * | 3/2020 | Yamashita | F02B 39/10 |
| 2008/0259666 A1 | | 10/2008 | Eguchi et al. | |
| 2012/0137676 A1 | * | 6/2012 | Murata | F02B 39/10 60/602 |
| 2014/0230436 A1 | | 8/2014 | Wong | |
| 2015/0285122 A1 | * | 10/2015 | Yamashita | F02B 41/10 60/618 |
| 2015/0330282 A1 | | 11/2015 | Cusworth et al. | |
| 2016/0138463 A1 | * | 5/2016 | Kubes | F01N 5/04 60/607 |
| 2016/0265422 A1 | * | 9/2016 | Yamashita | H02P 9/04 |
| 2016/0356210 A1 | * | 12/2016 | Yamashita | F02B 39/10 |
| 2017/0305298 A1 | | 10/2017 | Takeshima et al. | |
| 2018/0301719 A1 | * | 10/2018 | Orozco | B60L 1/20 |
| 2019/0160935 A1 | * | 5/2019 | Orozco Santos Coy | H01M 8/04753 |

FOREIGN PATENT DOCUMENTS

| | | | | |
|---|---|---|---|---|
| CN | 106030051 A | | 10/2016 | |
| JP | 9-51637 A | | 2/1997 | |
| JP | 09032567 A | * | 2/1997 | .............. F02B 41/10 |
| JP | 09032568 A | * | 2/1997 | .............. F02B 41/10 |
| JP | 2004-229461 A | | 8/2004 | |
| JP | 2005-9320 A | | 1/2005 | |
| JP | 2006-101668 A | | 4/2006 | |
| JP | 2006-291782 A | | 10/2006 | |
| JP | 2010-190145 A | | 9/2010 | |
| JP | 2011-31672 A | | 2/2011 | |
| JP | 2013-123281 A | | 6/2013 | |
| JP | 2013-207976 A | | 10/2013 | |
| JP | 2014-171314 A | | 9/2014 | |
| JP | 2015-537161 A | | 12/2015 | |
| JP | 2016-509970 A | | 4/2016 | |
| WO | WO 99/56011 A1 | | 11/1999 | |
| WO | WO 2016/117438 A1 | | 7/2016 | |

* cited by examiner

EXHAUST GAS ENERGY RECOVERY DEVICE

TECHNICAL FIELD

The present disclosure relates to an exhaust gas energy recovery device.

BACKGROUND ART

There is a turbocharger as an exhaust gas energy recovery mechanism of an engine. For example, Patent Literature 1 describes a turbocharger including a turbine unit having a turbine rotor, a compressor unit having a compressor rotor, and a connecting portion connecting the turbine rotor and the compressor rotor. Such a turbocharger rotates the turbine rotor by an exhaust gas of the engine, rotates the compressor rotor connected to the turbine rotor to compress the air, and supplies the compressed air to the engine.

CITATION LIST

Patent Literature

Patent Literature 1: Japanese Unexamined Patent Publication No. 2006-291782
Patent Literature 2: Japanese Unexamined Patent Publication No. 2011-31672
Patent Literature 3: International Publication No. 99/56011
Patent Literature 4: Japanese Unexamined Patent Publication No. 2006-101668
Patent Literature 5: Japanese Unexamined Patent Publication No. 2004-229461
Patent Literature 6: Japanese Unexamined Patent Publication No. H9-51637

SUMMARY OF INVENTION

Technical Problem

In a turbocharger used for a vehicle, the amount of gas discharged from an engine is small in a case where the engine operates at low rotation speed, for example. Therefore, the amount of air flowing into a compressor becomes small and the compression efficiency tends to decrease. On the other hand, in a case where the engine operates at a high rotation speed, a part of the gas discharged from the engine may be discharged without passing through a turbine by a wastegate or the like. Thus, there is room for improvement in the recovery efficiency of exhaust gas energy.

The present disclosure provides an exhaust gas energy recovery device capable of improving the recovery efficiency of exhaust gas energy.

Solution to Problem

An exhaust gas energy recovery device according to one aspect of the present disclosure includes a power generation device driven by a turbine configured to rotate by an exhaust gas, a switching element connected to the power generation device, a first terminal connected to the power generation device via the switching element and for being connected to a first power storage device, and a second terminal connected to the power generation device and for being connected to a second power storage device. A terminal voltage of the first power storage device is lower than a terminal voltage of the second power storage device. The switching element switches a destination to be charged by the power generation device to either the first power storage device or the second power storage device on the basis of magnitude of a direct current voltage output from the power generation device.

Effects of Invention

According to the present disclosure, the recovery efficiency of exhaust gas energy can be improved.

DESCRIPTION OF EMBODIMENTS

Since an embodiment according to the present disclosure to be described below is an example for describing the present invention, the present invention should not be limited to the following content.

[1] Outline of Embodiment

An exhaust gas energy recovery device according to one aspect of the present disclosure includes a power generation device driven by a turbine configured to rotate by an exhaust gas, a switching element connected to the power generation device, a first terminal connected to the power generation device via the switching element and for being connected to a first power storage device, and a second terminal connected to the power generation device and for being connected to a second power storage device. A terminal voltage of the first power storage device is lower than a terminal voltage of the second power storage device. The switching element switches a destination to be charged by the power generation device to either the first power storage device or the second power storage device on the basis of magnitude of a direct current voltage output from the power generation device.

In the exhaust gas energy recovery device, the power generation device is driven by the turbine configured to rotate by the exhaust gas, whereby energy of the exhaust gas is converted into electrical energy. The first power storage device is connected to the first terminal and the second power storage device is connected to the second terminal, of the exhaust gas energy recovery device, and the destination to be charged by the power generation device is switched to either the first power storage device or the second power storage device on the basis of the magnitude of the direct current voltage output from the power generation device. The energy conversion efficiency is higher when converting the rotation of the turbine into the electrical energy than when using the rotation of the turbine for compressing a gas like a turbocharger. However, the magnitude of the power generated by the power generation device varies with the rotation speed of the turbine. Therefore, by switching and charging the first power storage device and the second power storage device with different terminal voltages according to the direct current voltage of the power generated by the power generation device, the electrical energy can be recovered throughout a wide range of the rotation speed of the turbine. As a result, the recovery efficiency of exhaust gas energy can be improved.

The exhaust gas energy recovery device may further include a controller for controlling the switching element. The controller may control the switching element to be in an ON state in a case where the direct current voltage is lower than a first voltage that is a voltage able to be supplied to the first power storage device, and may control the switching element to be in an OFF state in a case where the direct current voltage is higher than a second voltage that is a voltage able to charge the second power storage device. A maximum voltage that can be supplied to the power storage device and a minimum voltage that can charge the power storage device are predetermined. If trying to charge the power storage device by a voltage exceeding the suppliable maximum voltage, the power storage device may be damaged. Further, the power storage device cannot be charged by a voltage lower than the terminal voltage of the power storage device. In the case where the direct current voltage is lower than the first voltage suppliable to the first power storage device, the switching element is controlled to be in the ON state, whereby the first power storage device is charged. Further, in the case where the direct current voltage is higher than the second voltage that can charge the second power storage device, the switching element is controlled to be in the OFF state, whereby the second power storage device is charged.

The controller may perform pulse width modulation control for the switching element in a case where the direct current voltage is equal to or higher than the first voltage and equal to or lower than the second voltage. In the case where the direct current voltage is equal to or lower than the second voltage, the second power storage device cannot be charged. Meanwhile, in the case where the direct current voltage is equal to or higher than the first voltage, if the direct current voltage is directly supplied to the first power storage device, the first power storage device may be damaged. Therefore, by performing the pulse width modulation control for the switching element, the first power storage device can be charged without being damaged. Thereby, in the case where the direct current voltage is equal to or higher than the first voltage and is equal to or lower than the second voltage, the electrical energy can be recovered. As a result, the recovery efficiency of exhaust gas energy can be further improved. In this manner, the first power storage device is charged in the case where the direct current voltage is low and the second power storage device is charged in the case where the direct current voltage is large, whereby the electrical energy can be recovered throughout a wide range of the rotation speed of the turbine.

An exhaust gas energy recovery device according to another aspect of the present disclosure includes a generator driven by a turbine configured to rotate by an exhaust gas, a first terminal for being connected to a first power storage device, a second terminal for being connected to a second power storage device, a first diode and a second diode connected to an output of the generator, a first capacitor connected in parallel to the first diode and the second diode, a third diode connected in series to the second terminal, a second capacitor connected in parallel to the first terminal, a fourth diode connected in parallel to the second capacitor, a reactor provided between a cathode of the fourth diode and one end of the second capacitor, and a switching element provided between one end of the first capacitor and one end of the reactor. An anode of the first diode and a cathode of the second diode are connected to each other and are connected to an output of the generator. A cathode of the first diode is connected to the one end of the first capacitor. An anode of the second diode is connected to the other end of the first capacitor. A cathode of the third diode is connected to the second terminal, and an anode of the third diode is connected to the one end of the first capacitor. The second terminal and the third diode are connected in parallel to the first capacitor.

[2] Exemplification of Embodiments

Hereinafter, an embodiment of the present disclosure will be described with reference to the drawings. Note that, in the description of the drawings, the same element is denoted by the same reference sign, and overlapping description is omitted.

Figure 1:
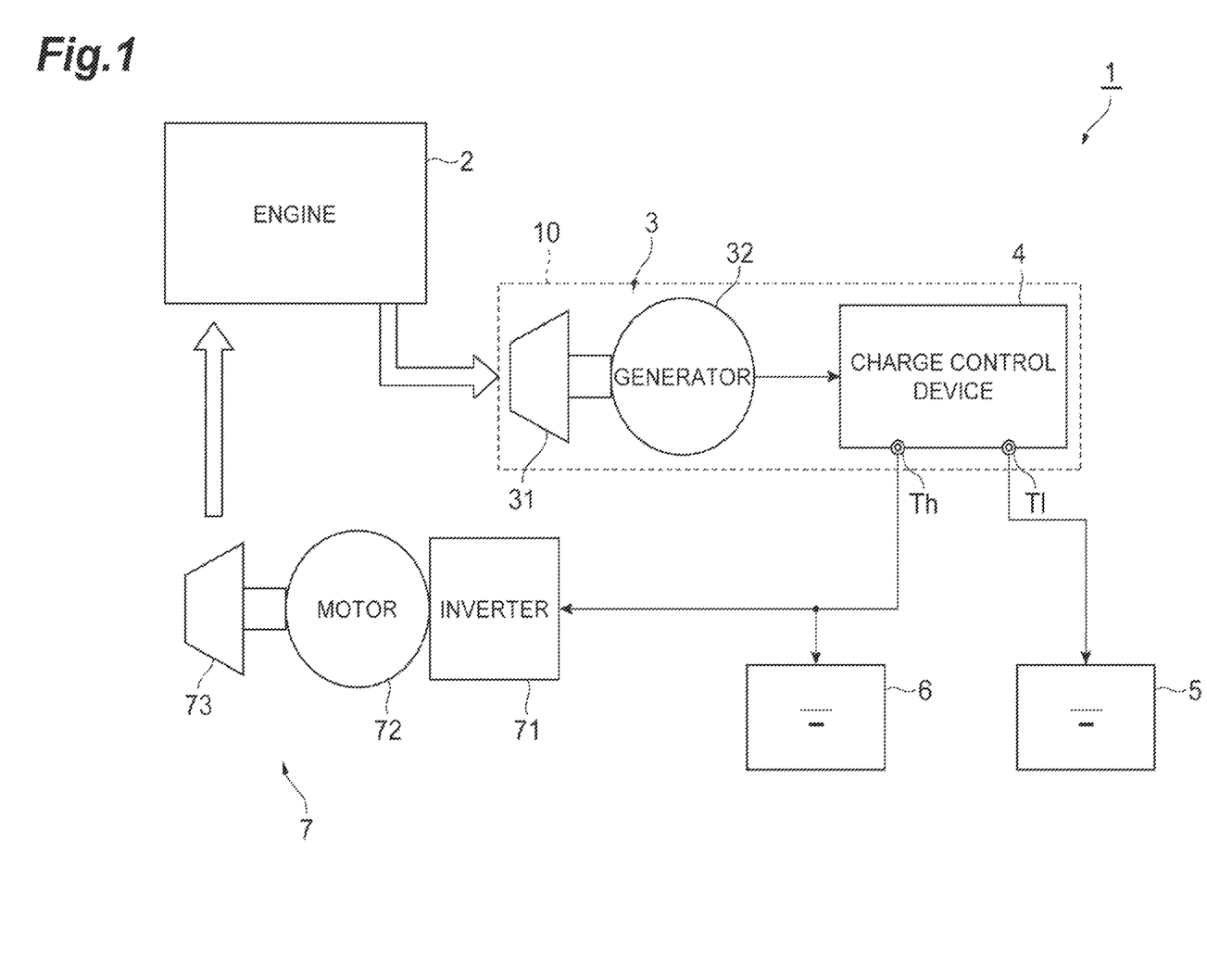
FIG. 1 is a diagram illustrating a schematic configuration of an exhaust gas energy recovery system including an exhaust gas energy recovery device according to the present embodiment.

FIG. 1 is a diagram illustrating a schematic configuration of an exhaust gas energy recovery system including an exhaust gas energy recovery device according to the present embodiment. As illustrated in FIG. 1, an exhaust gas energy recovery system 1 includes an engine 2, a turbine power generation device 3, a charge control device 4, a low-voltage power storage device 5 (first power storage device), a high-voltage power storage device 6 (second power storage device), and an electric compressor 7. The exhaust gas energy recovery system 1 is a system for recovering energy (exhaust heat) of an exhaust gas from the engine 2 as electrical energy. In the present embodiment, the exhaust gas energy recovery system 1 is applied to a hybrid vehicle. The hybrid vehicle to which the exhaust gas energy recovery system 1 is applied may be a mild hybrid vehicle or a strong hybrid vehicle.

The engine 2 is a driving force source of the hybrid vehicle. Examples of the engine 2 include a gasoline engine and a diesel engine.

The turbine power generation device 3 is a power generation device driven by a turbine, and converts the energy of the exhaust gas from the engine 2 into the electrical energy. The turbine power generation device 3 includes a turbine 31, a generator 32 connected to the turbine 31, a rectifier circuit 33 (see FIG. 2), and a capacitor C1 (see FIG. 2). In FIG. 1, the illustration of the rectifier circuit 33 and the capacitor C1 is omitted for the sake of convenience. The turbine 31 may be a radial turbine or an axial turbine. In the turbine power generation device 3, the turbine 31 rotates by the gas (exhaust gas) discharged from the engine 2, whereby the generator 32 is driven to generate the power. As the rotation speed of the turbine 31 becomes higher, the power generated by the generator 32 becomes larger.

The charge control device 4 controls a destination to be charged by the power generated by the turbine power generation device 3. The charge control device 4 includes a terminal T1 (first terminal) and a terminal Th (second terminal). The terminal T1 is a connection terminal for connecting the low-voltage power storage device 5. The terminal T1 is connected to the turbine power generation device 3 via a switching element SW (see FIG. 2) to be described below. The terminal Th is a connection terminal for connecting the high-voltage power storage device 6. The terminal Th is connected to the turbine power generation device 3. Note that an exhaust gas energy recovery device 10 is constituted by the turbine power generation device 3 and the charge control device 4. A detailed configuration of the exhaust gas energy recovery device 10 will be described below.

The low-voltage power storage device 5 is configured to be able to charge and discharge low-voltage power. The low-voltage power storage device 5 is, for example, a 12V battery. In this case, a lower limit voltage of a terminal voltage of the low-voltage power storage device 5 is, for example, 9 V. An upper limit voltage of the terminal voltage of the low-voltage power storage device 5 is, for example, 16 V. The terminal voltage of the low-voltage power storage device 5 is lower than a terminal voltage of the high-voltage power storage device 6. As the low-voltage power storage device 5, a lead storage battery is used, for example. The low-voltage power storage device 5 is charged by the exhaust gas energy recovery device 10. The electric power accumulated in the low-voltage power storage device 5 is supplied to, for example, an auxiliary machine.

The high-voltage power storage device 6 is configured to be able to charge and discharge high-voltage power. The high-voltage power storage device 6 is, for example, a 48V battery. In this case, a lower limit voltage of the terminal voltage of the high-voltage power storage device 6 is, for example, 36 V. An upper limit voltage of the terminal voltage of the high-voltage power storage device 6 is, for example, 60 V. As the high-voltage power storage device 6, a lithium ion battery is used, for example. The high-voltage power storage device 6 is charged by the exhaust gas energy recovery device 10. The power accumulated in the high-voltage power storage device 6 is supplied to the electric compressor 7, a power steering mechanism (not illustrated), a starter, and the like.

Note that the lower limit voltage of the terminal voltage is a minimum voltage that can charge the power storage device. The upper limit voltage of the terminal voltage is a maximum allowable terminal voltage that can be supplied to the power storage device, and is determined by standards such as VDA 320 and ISO 16750-2, for example.

The electric compressor 7 compresses the air and supplies the compressed air to the engine 2. The electric compressor 7 includes an inverter 71, a motor 72, and a compressor 73 connected to the motor 72. The inverter 71 converts direct current power supplied from the high-voltage power storage device 6 into alternating current power, and supplies the alternating current power to the motor 72. The motor 72 is driven by the alternating current power supplied from the inverter 71. The compressor 73 is attached to a rotating shaft of the motor 72 and rotates as the motor 72 is driven. By the rotation of the compressor 73, the air is compressed.

Figure 2:
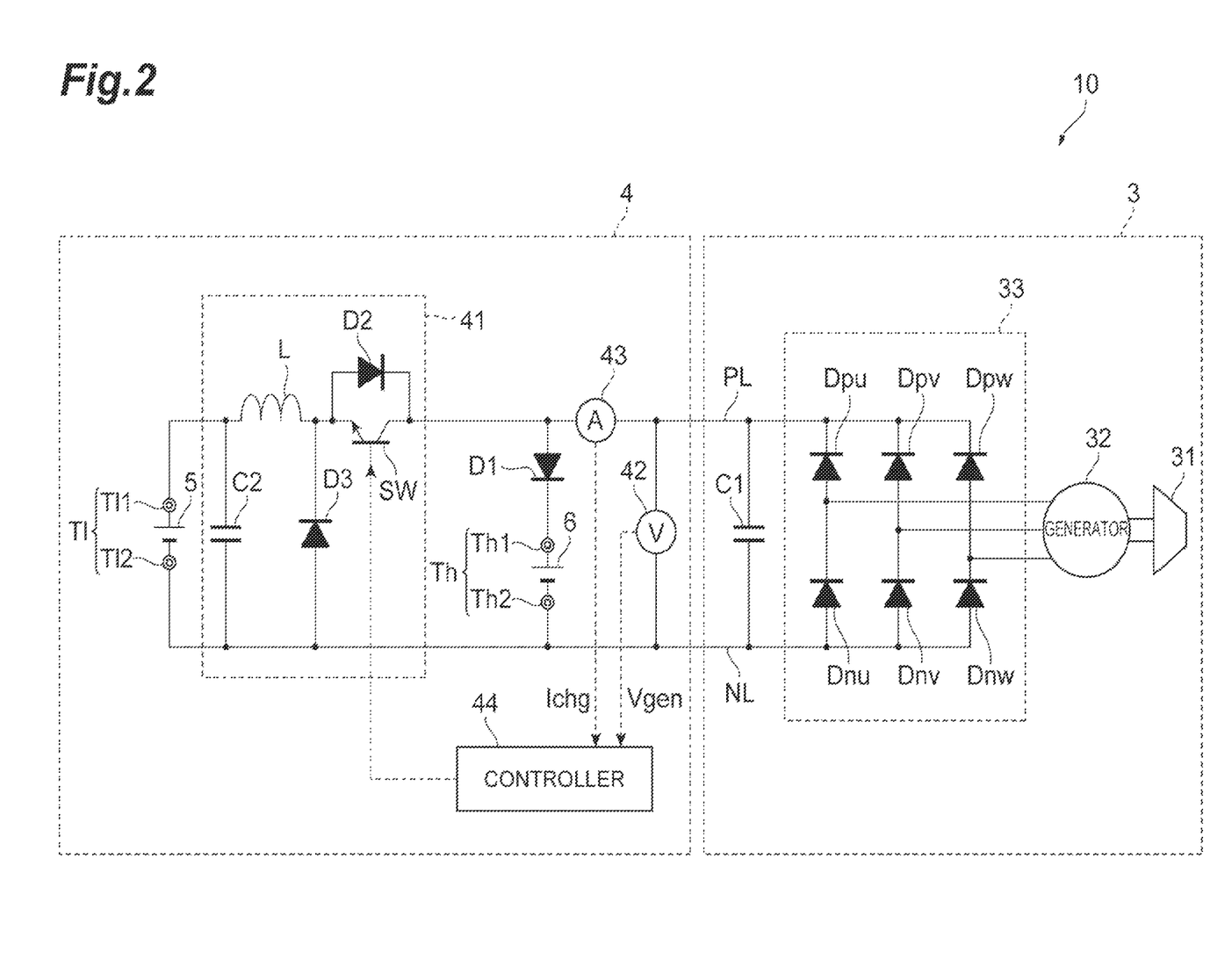
FIG. 2 is a circuit configuration diagram of the exhaust gas energy recovery device illustrated in FIG. 1.

FIG. 2 is a circuit configuration diagram of the exhaust gas energy recovery device illustrated in FIG. 1. As illustrated in FIG. 2, the exhaust gas energy recovery device 10 includes the turbine power generation device 3 and the charge control device 4.

As described above, the turbine power generation device 3 includes the turbine 31, the generator 32, the rectifier circuit 33, and the capacitor C1 (first capacitor). The generator 32 is, for example, a permanent magnet generator. The generator 32 is driven by the rotation of the turbine 31 to generate power. In the present embodiment, the generator 32 is a three-phase alternating current generator.

The rectifier circuit 33 rectifies the power (alternating current power) generated by the generator 32. The rectifier circuit 33 includes diodes Dpu, Dnu, Dpv, Dnv, Dpw, and Dnw. The pair of diodes Dpu and Dnu is a U-phase rectifier circuit. An anode of the diode Dpu and a cathode of the diode Dnu are connected to each other and are also connected to a U-phase output line of the generator 32. The pair of diodes Dpv and Dnv is a V-phase rectifier circuit. An anode of the diode Dpv and a cathode of the diode Dnv are connected to each other and are also connected to a V-phase output line of the generator 32. The pair of diodes Dpw and Dnw is a W-phase rectifier circuit. An anode of the diode Dpw and a cathode of the diode Dnw are connected to each other and are also connected to a W-phase output line of the generator 32.

The capacitor C1 is a capacitor for smoothing the power rectified by the rectifier circuit 33. Specifically, the capacitor C1 smooths the voltage of the full-wave rectified power and outputs a direct current voltage. The cathodes of the diodes Dpu, Dpv, and Dpw (first diodes) are connected to one another and are also connected to one end of the capacitor C1. The anodes of the diodes Dnu, Dnv, and Dnw (second diodes) are connected to one another and are connected to the other end of the capacitor C1. In other words, the U-phase diodes Dpu and Dnu, the V-phase diodes Dpv and Dnv, the W-phase diodes Dpw and Dnw, and the capacitor C1 are connected in parallel to one another. A line to which the one end of the capacitor C1 is connected is referred to as a positive electrode line PL and a line to which the other end of the capacitor C1 is connected is referred to as a negative electrode line NL.

In the turbine power generation device 3, a rotation speed Nt (see FIG. 3) of the turbine 31 and a voltage (potential difference) (voltage value Vgen to be described below) between both ends of the capacitor C1 correspond one to one. Hereinafter, the "voltage between both ends of the capacitor C1" may be simply referred to as a "voltage of the capacitor C1". As the rotation speed Nt increases, the voltage value Vgen also becomes larger. The output voltage of the turbine power generation device 3 is the voltage of the capacitor C1.

The charge control device 4 includes a step-down chopper circuit 41, a voltmeter 42, an ammeter 43, a controller 44, a diode D1 (third diode), a terminal Th, and a terminal T1. The terminal Th includes a terminal Th1 for connecting a positive electrode terminal of the high-voltage power storage device 6 and a terminal Th2 for connecting a negative electrode terminal of the high-voltage power storage device 6. The terminal T1 includes a terminal T11 for connecting a positive electrode terminal of the low-voltage power storage device 5 and a terminal T12 for connecting a negative electrode terminal of the low-voltage power storage device 5. The terminals Th2 and T12 are connected to the negative electrode line NL.

The diode D1 is a diode for preventing reverse flow. The diode D1 and the terminal Th are connected in series and are connected in parallel to the capacitor C1. Specifically, a cathode of the diode D1 is connected to the terminal Th1, and an anode of the diode D1 is connected to the positive electrode line PL. That is, the anode of the diode D1 is connected to the one end of the capacitor C1. The diode D1 prevents a current from flowing from the high-voltage power storage device 6 to the capacitor C1 in a case where the voltage of the capacitor C1 is lower than the terminal voltage of the high-voltage power storage device 6. In a case where the voltage of the capacitor C1 is higher than the terminal voltage of the high-voltage power storage device 6, the diode D1 becomes in an ON state, and the current flows from the one end of the capacitor C1 into the high-voltage power storage device 6 via the diode D1.

The step-down chopper circuit 41 is a circuit for converting the output voltage of the turbine power generation device 3 into a desired direct current voltage. The step-down chopper circuit 41 includes the switching element SW, a diode D2, a diode D3 (fourth diode), a reactor L, and a capacitor C2 (second capacitor).

The switching element SW is an element that can switch electrical opening and closing. That is, the switching element SW is switched between an ON state in which both ends (a collector and an emitter) of the switching element SW are in an electrically conductive state, and an OFF state in which the both ends of the switching element SW are electrically isolated from each other. As the switching element SW, an insulated gate bipolar transistor (IGBT), a metal oxide semiconductor field effect transistor (MOSFET), a bipolar transistor, or the like is used, for example. The switching element SW is connected to the turbine power generation device 3 and is provided between one end of the capacitor C1 and one end of the reactor L. Specifically, the collector of the switching element SW is connected to the positive electrode line PL, and the emitter of the switching element SW is connected to the terminal T11 via the reactor L. A drive signal is supplied from the controller 44 to a base (control terminal) of the switching element SW. The switching element SW switches between the ON state and the OFF state in response to the drive signal output from the controller 44. The switching element SW is controlled by the controller 44 to switch the destination to be charged by the turbine power generation device 3 to either low-voltage power storage device 5 or the high-voltage power storage device 6 on the basis of the magnitude of the output voltage of the turbine power generation device 3.

The diode D2 is a diode for preventing reverse flow and electrically connected in parallel to the switching element SW. Specifically, a cathode of the diode D2 is connected to the collector of the switching element SW, and an anode of the diode D2 is connected to the emitter of the switching element SW.

The capacitor C2 is a smoothing capacitor for maintaining the voltage to be supplied to the low-voltage power storage device 5 at a constant level. The capacitor C2 is connected in parallel to the low-voltage power storage device 5 (terminal T1). That is, one end of the capacitor C2 is connected to the terminal T11, and the other end of the capacitor C2 is connected to the negative electrode line NL.

The diode D3 is a freewheel diode that freewheels the current to release the energy accumulated in the reactor L in a case where the switching element SW is in the OFF state. The diode D3 is connected in parallel to the capacitor C2. That is, a cathode of the diode D3 is connected to the emitter of the switching element SW, and an anode of the diode D3 is connected to the negative electrode line NL.

The reactor L is an element for suppressing variation of the current. The reactor L is provided between the cathode of diode D3 and the one end of capacitor C2. The one end of the reactor L is connected to the emitter of the switching element SW, and the other end of the reactor L is connected to the terminal T11 and the one end of the capacitor C2.

The voltmeter 42 is connected in parallel to the capacitor C1 and measures the voltage (voltage value Vgen) between the both ends of the capacitor C1. The voltmeter 42 outputs the voltage value Vgen, having a positive value in a case where the potential of the one end of the capacitor C1 is larger than the potential of the other end, and having a negative value in a case where the potential of the other end of the capacitor C1 is larger than the potential of the one end. The voltmeter 42 outputs the measured voltage value Vgen to the controller 44.

The ammeter 43 is provided in series between the one end of the capacitor C1 and the switching element SW, and measures a regenerative current. The ammeter 43 outputs a current value Ichg, having the current flowing from the turbine power generation device 3 to the charge control device 4 as a positive value. The ammeter 43 outputs the measured current value Ichg to the controller 44.

The controller 44 is a control device that controls the switching element SW. The controller 44 is, for example, a computer including hardware such as a central processing unit (CPU) and memories such as a random access memory (RAM) and a read only memory (ROM). Functions of the controller 44 are realized by operating the hardware under control of the CPU based on a computer program stored in the memory. The controller 44 controls the switching element SW on the basis of the voltage value Vgen output from the voltmeter 42 and the current value Ichg output from the ammeter 43. The controller 44 controls the switching element SW to switch the destination to be charged by the turbine power generation device 3 to either the low-voltage power storage device 5 or the high-voltage power storage device 6.

Figure 3:
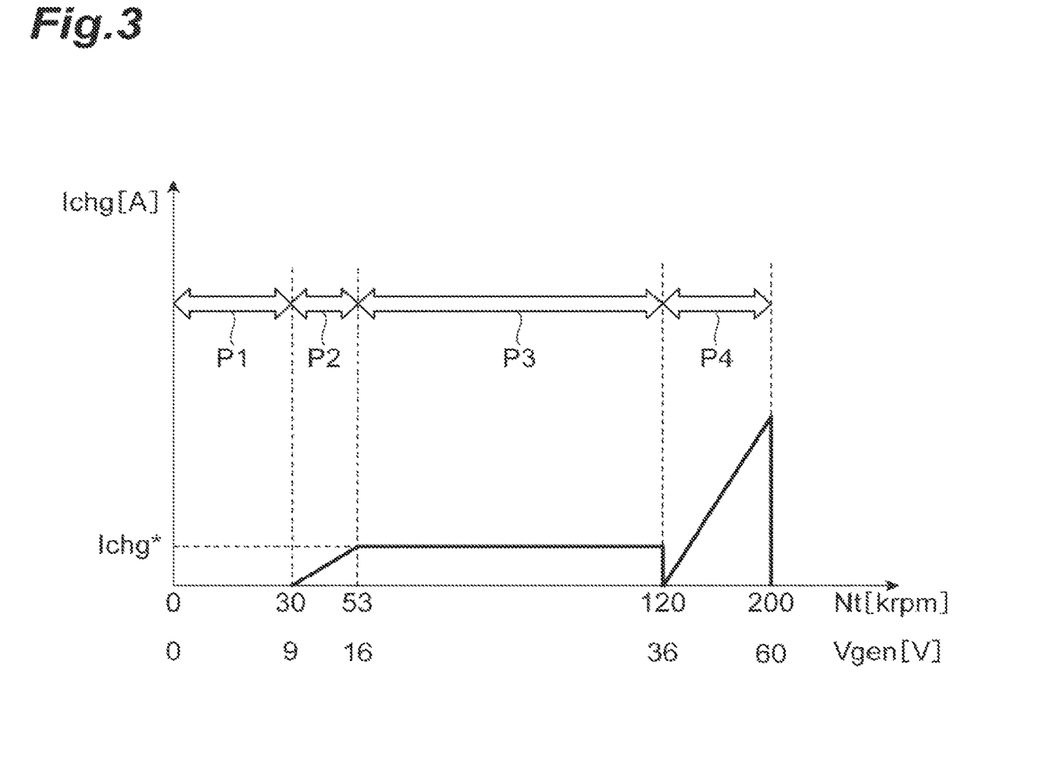
FIG. 3 is a diagram illustrating a relationship between a rotation speed of a turbine and an output voltage of a turbine power generation device, and a regenerative current.
Figure 4:
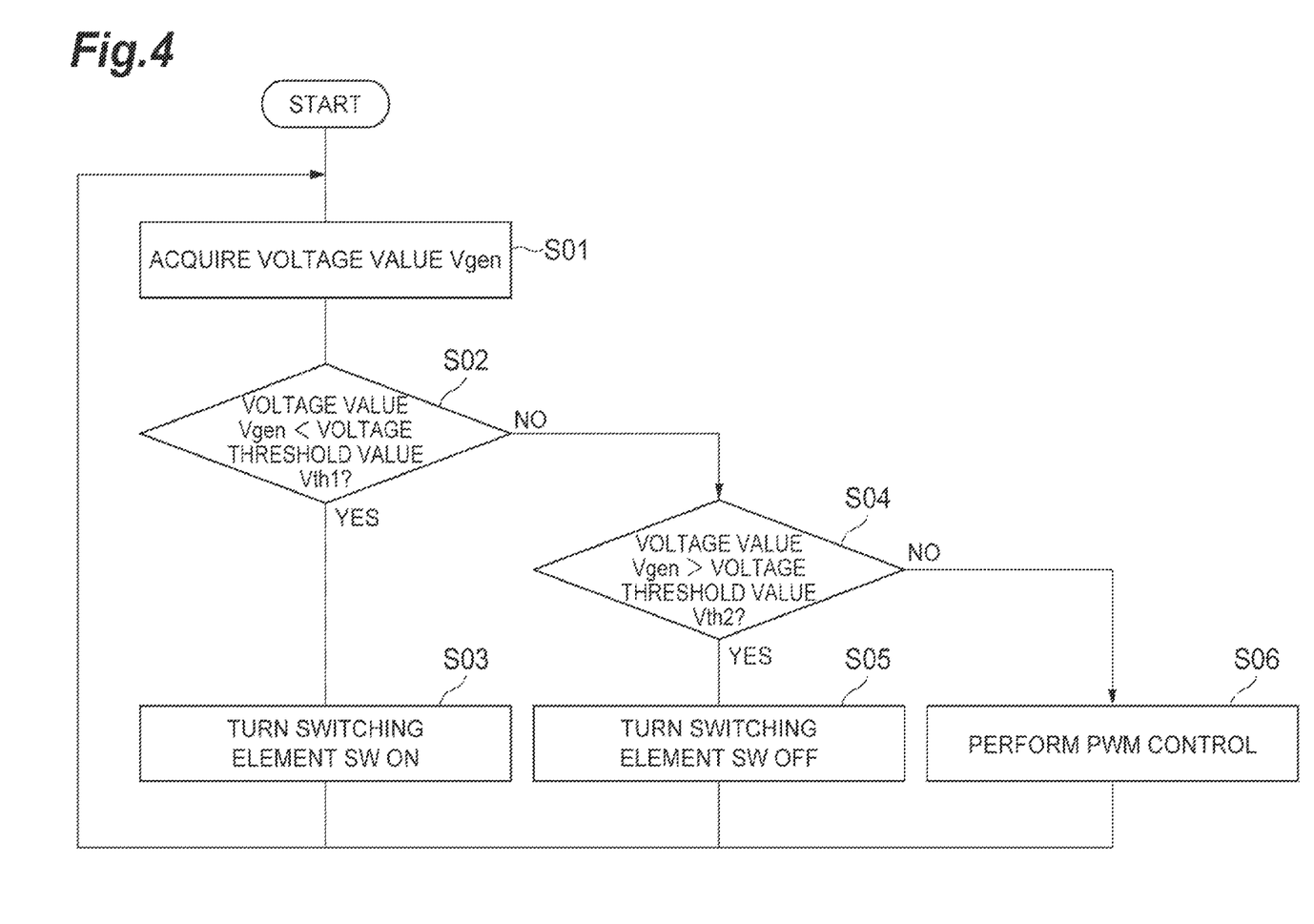
FIG. 4 is a flowchart illustrating a series of processing of switching control by a controller.

The control of switching the destination to be charged by the controller 44 will be further specifically described with reference to FIGS. 3 and 4. FIG. 3 is a diagram illustrating a relationship between a rotation speed of a turbine and an output voltage of a turbine power generation device, and a regenerative current. FIG. 4 is a flowchart illustrating a series of processing of switching control by a controller. The horizontal axis in FIG. 3 represents the voltage value Vgen [V] and the rotation speed Nt [krpm], and the vertical axis in FIG. 3 represents the current value Ichg [A]. In the example in FIG. 3, a 12V battery is used as the low-voltage power storage device 5 and a 48V battery is used as the high-voltage power storage device 6. Here, the rotation speed Nt represents a numerical value of an example, and the correspondence relationship of the rotation speed Nt to the voltage value Vgen can vary depending on characteristics of the turbine 31 or the like. The processing illustrated in FIG. 4 is started when the exhaust gas energy recovery system 1 starts the operation.

First, the controller 44 acquires the voltage value Vgen from the voltmeter 42 (step S01). Then, the controller 44 compares the voltage value Vgen with a voltage threshold value Vth1 and a voltage threshold value Vth2. The voltage threshold value Vth1 is a value determined according to the low-voltage power storage device 5. As the voltage threshold value Vth1, an upper limit voltage of the terminal voltage of the low-voltage power storage device 5 is used, for example. In the example of FIG. 3, the voltage threshold value Vth1 is set to 16 V. The voltage threshold value Vth2 is a value determined according to the high-voltage power storage device 6. As the voltage threshold value Vth2, a lower limit voltage of the terminal voltage of the high-voltage power storage device 6 is used, for example. In the example of FIG. 3, the voltage threshold value Vth2 is set to 36 V.

Specifically, the controller 44 determines whether the voltage value Vgen is smaller than the voltage threshold value Vth1 (step S02). In a case where the controller 44 determines that the voltage value Vgen is smaller than the voltage threshold value Vth1 (step S02: Yes), the controller 44 controls the switching element SW to be in the ON state (step S03). At this time, when the voltage (voltage value Vgen) of the capacitor C1 is equal to or lower than the lower limit voltage (9 V in this example) of the terminal voltage of the low-voltage power storage device 5, as illustrated in a section P1 in FIG. 3, the regenerative current does not flow and the low-voltage power storage device 5 is not charged.

In this section P1, the energy recovered by the turbine power generation device 3 is exclusively used for acceleration torque for increasing the rotational speed of the turbine 31.

Meanwhile, when the voltage (voltage value Vgen) of the capacitor C1 is higher than the lower limit voltage of the terminal voltage of the low-voltage power storage device 5, the regenerative current flows from the one end of the capacitor C1 into the positive electrode terminal of the low-voltage power storage device 5 via the switching element SW and the reactor L. As illustrated in a section P2 in FIG. 3, the current value Ichg of the regenerative current becomes larger as the voltage of the capacitor C1 becomes higher than the terminal voltage of the low-voltage power storage device 5. Thereby, the low-voltage power storage device 5 is charged. Note that, since the voltage of the capacitor C1 is lower than the terminal voltage of the high-voltage power storage device 6, the high-voltage power storage device 6 is not charged. Further, the diode D1 prevents the current from flowing from the high-voltage power storage device 6 to the capacitor C1.

In a case where the controller 44 determines that the voltage value Vgen is equal to or larger than the voltage threshold value Vth1 in the determination of step S02 (step S02: No), the controller 44 determines whether the voltage value Vgen is larger than the voltage threshold value Vth2 (step S04). In a case where the controller 44 determines that the voltage value Vgen is larger than the voltage threshold value Vth2 (step S04: Yes), the controller 44 controls the switching element SW to be in the OFF state (step S05). In this case, the regenerative current flows from the one end of the capacitor C1 into the positive electrode terminal of the high-voltage power storage device 6 via the diode D1. Thereby, the high-voltage power storage device 6 is charged. Note that, since the switching element SW is in the OFF state, the low-voltage power storage device 5 is not charged. As illustrated in a section P4 in FIG. 3, in this state, the current value Ichg of the regenerative current becomes larger as the voltage of the capacitor C1 becomes higher than the terminal voltage of the high-voltage power storage device 6. When the voltage of the capacitor C1 is the same as the terminal voltage (voltage threshold value Vth2) of the high-voltage power storage device 6, no regenerative current flows.

By the way, in a case where the voltage of the capacitor C1 exceeds the upper limit voltage (60 V in this example) of the terminal voltage of the high-voltage power storage device 6, the high-voltage power storage device 6 may be damaged and thus the high-voltage power storage device 6 cannot be charged. Therefore, the turbine power generation device 3 (generator 32) is designed such that the voltage (voltage value Vgen) of the capacitor C1 corresponding to a maximum value of the rotation speed Nt of the turbine 31 does not exceed the upper limit voltage of the terminal voltage of the high-voltage power storage device 6. In the example of FIG. 3, the turbine power generation device 3 is designed such that the voltage of the capacitor C1 corresponding to the maximum value of the rotation speed Nt of the turbine 31 coincides with the upper limit voltage of the terminal voltage of the high-voltage power storage device 6.

In a case where the controller 44 determines that the voltage value Vgen is equal to or smaller than the voltage threshold value Vth2 (step S04: No), that is, in a case where the controller 44 determines that the voltage value Vgen is equal to or larger than the voltage threshold value Vth1 and equal to or smaller than the voltage threshold value Vth2, in the determination in step S04, the controller 44 performs pulse width modulation (PWM) control for the switching element SW (step S06). For example, the controller 44 acquires the current value Ichg from the ammeter 43. Then, the controller 44 calculates a difference between a specified current value Ichg* and the current value Ichg, and performs proportional-integral (PI) control such that the difference becomes zero. The specified current value Ichg* is the current value Ichg of the regenerative current in a case where the voltage value Vgen is equal to the voltage threshold value Vth1, as illustrated in a section P3 in FIG. 3, for example. The specified current value Ichg* is preset in the controller 44. The controller 44 determines a pulse width and a duty ratio of the PWM control on the basis of an operation amount of the PI control and the voltage value Vgen. The controller 44 performs control to lower the duty ratio as the voltage value Vgen is larger. Note that the duty ratio is a ratio of time of the ON state in one period of time for switching between the ON state and the OFF state of the switching element SW.

In the PWM control, the step-down chopper circuit 41 operates. Specifically, when the switching element SW is in the ON state, the regenerative current flows from the one end of the capacitor C1 into the positive electrode terminal of the low-voltage power storage device 5 via the switching element SW and the reactor L. When the switching element SW is in the OFF state, the current of the reactor L flows into the positive electrode terminal of the low-voltage power storage device 5 via the diode D3. By repeatedly switching between the ON state and the OFF state of the switching element SW, the low-voltage power storage device 5 is continuously charged. Even when the voltage of the capacitor C1 is equal to or higher than the upper limit voltage of the terminal voltage of the low-voltage power storage device 5 and equal to or lower than the lower limit voltage of the terminal voltage of the high-voltage power storage device 6, the low-voltage power storage device 5 is charged at a voltage equal to or lower than the upper limit voltage of the terminal voltage of the low-voltage power storage device 5.

The controller 44 repeats the series of processing from step S01 again after performing the processing of step S03, S05, or S06.

According to the exhaust gas energy recovery device 10 described above, the turbine power generation device 3 is driven by the turbine 31 that rotates by the exhaust gas, whereby the energy of the exhaust gas is converted into the electrical energy. The low-voltage power storage device 5 is connected to the terminal T1 and the high-voltage power storage device 6 is connected to the terminal Th, of the exhaust gas energy recovery device 10, and the destination to be charged by the turbine power generation device 3 is switched to either the low-voltage power storage device 5 or the high-voltage power storage device 6 on the basis of the magnitude of the output voltage of the turbine power generation device 3.

The energy conversion efficiency is higher when converting the rotation of the turbine into the electrical energy than when using the rotation of the turbine for compressing a gas like a turbocharger. The turbocharger generally cannot highly efficiently operate in an entire operating region. For example, in the case of a turbocharger for a high flow rate, the compression efficiency in a low flow rate region is reduced. In the case of a turbocharger for a low flow rate, the compression efficiency on a high flow rate side is poor, and an absolute amount of energy that cannot be converted into work becomes large. Further, a part of the gas discharged from the engine may be discharged without passing through the turbine by a wastegate or the like. Therefore, if the energy of the exhaust gas is temporarily converted to the electrical energy as in the present embodiment, the operation in a region with low efficiency as a turbocharger can be avoided and therefore the recovery efficiency of exhaust gas energy can be improved.

Here, the magnitude of the power generated by the turbine power generation device 3 varies with the rotation speed Nt of the turbine 31. Meanwhile, since the lower limit voltage and the upper limit voltage are present in the terminal voltage in the power storage device, as described above, the voltage cannot be charged depending on the value of the voltage generated according to the rotation of the turbine. Therefore, by switching and charging the low-voltage power storage device 5 and the high-voltage power storage device 6 with different terminal voltages according to the output voltage of the turbine power generation device 3, the electrical energy is recovered throughout a wide range of the rotation speed Nt of the turbine 31. As a result, improvement of the recovery efficiency of exhaust gas energy can be realized.

The maximum voltage (the upper limit voltage of the terminal voltage) that can be supplied to the power storage device and the minimum voltage (the lower limit voltage of the terminal voltage) that can charge the power storage device are predetermined. If trying to charge the power storage device by a voltage exceeding the suppliable maximum voltage, the power storage device may be damaged. Further, the power storage device cannot be charged by a voltage lower than the terminal voltage of the power storage device. In the exhaust gas energy recovery device 10, the voltage threshold value Vth1 is set to the upper limit voltage of the terminal voltage of the low-voltage power storage device 5 and the voltage threshold value Vth2 is set to the lower limit voltage of the high-voltage power storage device 6. In the exhaust gas energy recovery device 10, the low-voltage power storage device 5 is charged when the switching element SW is switched to the ON state in the case where the output voltage of the turbine power generation device 3 is smaller than the voltage threshold value Vth1. Further, the high-voltage power storage device 6 is charged when the switching element SW is switched to the OFF state in the case where the output voltage of the turbine power generation device 3 is larger than the voltage threshold value Vth2. By charging the low-voltage power storage device 5 in the case where the output voltage of the turbine power generation device 3 is low and charging the high-voltage power storage device 6 in the case where the output voltage of the turbine power generation device 3 is high in this manner, the electrical energy can be recovered throughout a wide range of the rotation speed Nt of the turbine 31.

Further, in the case where the output voltage of the turbine power generation device 3 is equal to or smaller than the voltage threshold value Vth2, the high-voltage power storage device 6 cannot be charged. Meanwhile, in the case where the output voltage of the turbine power generation device 3 is equal to or larger than the voltage threshold value Vth1, if the output voltage is directly supplied to the low-voltage power storage device 5, the low-voltage power storage device 5 may be damaged. Therefore, by performing the PWM control for the switching element SW, the low-voltage power storage device 5 can be charged without being damaged. As a result, even in the case where the output voltage of the turbine power generation device 3 is equal to or larger than the voltage threshold value Vth1 and equal to or smaller than the voltage threshold value Vth2, the electrical energy can be recovered.

Note that, by using the step-down chopper circuit 41, only the low-voltage power storage device 5 can be charged by the power generated by the turbine power generation device 3. However, the number of auxiliary machines that operates by the power supplied by the low-voltage power storage device 5 is small. Therefore, even if the low-voltage power storage device 5 is charged by the power, the use efficiency of the power accumulated in the low-voltage power storage device 5 is not sufficient. Meanwhile, in the exhaust gas energy recovery device 10, in the case where the rotation speed Nt of the turbine 31 is low, the low-voltage power storage device 5 is charged because the power generated by the turbine power generation device 3 is small. In the case where the rotation speed Nt of the turbine 31 is high, the high-voltage power storage device 6 is charged because the power generated by the turbine power generation device 3 is large. Then, in the case where the output voltage of the turbine power generation device 3 is between the voltage threshold value Vth1 and the voltage threshold value Vth2, the low-voltage power storage device 5 is charged by performing the PWM control for the output voltage of the turbine power generation device 3. In this manner, the energy of the exhaust gas from the engine 2 can be recovered as the electrical energy in a wide region from the low rotation operation to the high rotation operation of the engine 2. As a result, the recovery efficiency of exhaust gas energy can be improved.

Further, since the power accumulated in the high-voltage power storage device 6 is supplied to the electric compressor 7, the efficiency of the engine 2 can be further improved.

Although the embodiment of the present disclosure has been described above, the present invention is not limited to the above embodiment. For example, the exhaust gas energy recovery system 1 may include a fuel cell in place of the engine 2. That is, the exhaust gas energy recovery system 1 can also be applied to a fuel cell vehicle (FCV).

Further, the exhaust gas energy recovery device 10 may be provided in a supercharger. For example, the exhaust gas energy recovery device 10 may recover energy of a gas released by a wastegate as the electrical energy.

The voltage threshold value Vth1 is not limited to the upper limit voltage of the terminal voltage of the low-voltage power storage device 5, and can be any voltage as long as the voltage can be supplied to the low-voltage power storage device 5. The voltage threshold value Vth2 is not limited to the lower limit voltage of the terminal voltage of the high-voltage power storage device 6, and can be any voltage as long as the voltage can charge the high-voltage power storage device 6.

The low-voltage power storage device 5 is not limited to a 12V battery, and the high-voltage power storage device 6 is not limited to a 48V battery. The terminal voltage of the low-voltage power storage device 5 may simply be lower than the terminal voltage of the high-voltage power storage device 6. Specifically, the maximum voltage (the upper limit voltage of the terminal voltage of the low-voltage power storage device 5) that can be supplied to the low-voltage power storage device 5 may simply be lower than the minimum voltage (the lower limit voltage of the terminal voltage of the high-voltage power storage device 6) that can charge the high-voltage power storage device 6.

Although the generator 32 outputs the three-phase alternating current power, the output power is not limited thereto. The number of phases of the alternating current power may be two phases, six phases, or the like, and is not limited to the three phases. The rectifier circuit 33 may have a pair of diodes according to the number of phases. Further, the generator 32 may output direct current power. In this case, the turbine power generation device 3 need not have the rectifier circuit 33.

REFERENCE SIGNS LIST

1 Exhaust gas energy recovery system
2 Engine
3 Turbine power generation device (power generator)
4 Charge control device
5 Low-voltage power storage device (first power storage device)
6 High-voltage power storage device (second power storage device)
7 Electric compressor
10 Exhaust gas energy recovery device
31 Turbine
32 Generator
33 Rectifier circuit
41 Step-down chopper circuit
44 Controller
71 Inverter
72 Motor
73 Compressor
C1 Capacitor (first capacitor)
C2 Capacitor (second capacitor)
D1 Diode (third diode)
D2 Diode
D3 Diode (fourth diode)
Dpu, Dpv, Dpw Diode (first diode)
Dnu, Dnv, Dnw Diode (second diode)
L Reactor
PL Positive electrode line
NL Negative electrode line
SW Switching element
Th Terminal (second terminal)
Th1 Terminal
Th2 Terminal
T1 Terminal (first terminal)
T11 Terminal
T12 Terminal

The invention claimed is:

1. An exhaust gas energy recovery device, comprising:
a power generation device driven by a turbine configured to rotate by an exhaust gas of an engine;
a first terminal connected to the power generation device and connected to a first power storage device;
a second terminal connected to the power generation device and connected to a second power storage device;
a switching element connected to the power generation device that switches a destination to be charged by the power generation device to either the first power storage device or the second power storage device;
a voltmeter configured to measure a direct current voltage output from the power generation device; and
a controller configured to control the switching element to switch the destination to be charged based on a magnitude of the direct current voltage output from the power generation device measured by the voltmeter, wherein
a terminal voltage of the first power storage device is lower than a terminal voltage of the second power storage device.

2. The exhaust gas energy recovery device according to claim 1, wherein the controller controls the switching element to be in an ON state in a case where the direct current voltage measured by the voltmeter is lower than a first voltage that is a voltage able to be supplied to the first power storage device, and controls the switching element to be in an OFF state in a case where the direct current voltage measured by the voltmeter is higher than a second voltage that is a voltage able to charge the second power storage device.

3. The exhaust gas energy recovery device according to claim 2, wherein the controller performs pulse width modulation control for the switching element in a case where the direct current voltage measured by the voltmeter is equal to or higher than the first voltage and equal to or lower than the second voltage.

4. An exhaust gas energy recovery device, comprising:
a generator driven by a turbine configured to rotate by an exhaust gas of an engine;
a first terminal for being connected to a first power storage device;
a second terminal for being connected to a second power storage device;
a first diode and a second diode connected to an output of the generator;
a first capacitor connected in parallel to the first diode and the second diode;
a third diode connected in series to the second terminal;
a second capacitor connected in parallel to the first terminal;
a fourth diode connected in parallel to the second capacitor;
a reactor provided between a cathode of the fourth diode and one end of the second capacitor;
a voltmeter configured to measure a voltage between both ends of the first capacitor;
a switching element provided between one end of the first capacitor and one end of the reactor; and
a controller configured to control the switching element, wherein
an anode of the first diode and a cathode of the second diode are connected to each other and are connected to the output of the generator,
a cathode of the first diode is connected to the one end of the first capacitor,
an anode of the second diode is connected to another end of the first capacitor,
a cathode of the third diode is connected to the second terminal,
an anode of the third diode is connected to the one end of the first capacitor,
the second terminal and the third diode are connected in parallel to the first capacitor, and
the controller is configured to
control the switching element to be in an ON state in a case where the voltage between both ends of the first capacitor measured by the voltmeter is lower than a first voltage that is a voltage able to be supplied to the first power storage device,
control the switching element to be in an OFF state in a case where the voltage between both ends of the first capacitor measured by the voltmeter is higher than a second voltage that is a voltage able to charge the second power storage device, and
perform pulse width modulation control for the switching element in a case where the voltage between both ends of the first capacitor measured by the voltmeter is equal to or higher than the first voltage and equal to or lower than the second voltage.

* * * * *